US012671903B1

(12) United States Patent
Liao et al.

(10) Patent No.: US 12,671,903 B1
(45) Date of Patent: Jun. 30, 2026

(54) CAMERA COMPRISING A ROLL CORRECTION ACTUATOR

(71) Applicant: Apple Inc., Cupertino, CA (US)

(72) Inventors: Xiao Liao, Santa Clara, CA (US); Bin Xu, Sunnyvale, CA (US); Aurelien R Hubert, San Jose, CA (US); Zhuzhen Ji, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 115 days.

(21) Appl. No.: 18/779,173

(22) Filed: Jul. 22, 2024

Related U.S. Application Data

(60) Provisional application No. 63/582,245, filed on Sep. 13, 2023.

(51) Int. Cl.
| | |
|---|---|
| *H04N 23/68* | (2023.01) |
| *G02B 27/64* | (2006.01) |
| *H02K 41/035* | (2006.01) |
| *H04N 23/51* | (2023.01) |
| *H04N 23/54* | (2023.01) |
| *H04N 23/57* | (2023.01) |

(52) U.S. Cl.
CPC ....... *H04N 23/687* (2023.01); *H02K 41/0354* (2013.01); *H04N 23/51* (2023.01); *H04N 23/54* (2023.01); *H04N 23/57* (2023.01); *H04N 23/681* (2023.01); *G02B 27/646* (2013.01); *G03B 2205/0069* (2013.01)

(58) Field of Classification Search
CPC ........ H04N 23/50; H04N 23/51; H04N 23/54;

H04N 23/55; H04N 23/57; H04N 23/58; H04N 23/685; H04N 23/687; H04N 23/681–6815; H02K 41/0354; H02K 41/0356; G02B 27/64; G02B 27/646; G03B 2205/0007; G03B 2205/0015; G03B 2205/0038; G03B 2205/0053; G03B 2205/0069

See application file for complete search history.

(56) References Cited

U.S. PATENT DOCUMENTS

| | | | | |
|---|---|---|---|---|
| 2009/0128647 | A1* | 5/2009 | Fahn | H04N 23/695 |
| | | | | 348/E5.037 |
| 2019/0174044 | A1* | 6/2019 | Honsho | G02B 27/646 |
| 2021/0321024 | A1* | 10/2021 | Song | H05K 1/181 |

* cited by examiner

*Primary Examiner* — Twyler L Haskins
*Assistant Examiner* — Akshay Trehan
(74) *Attorney, Agent, or Firm* — Meitar Patents Ltd.; Daniel Kligler

(57) ABSTRACT

A camera, consisting of a housing and an image sensor contained in the housing. The camera also has objective optics, which are coupled to the housing and which have an optical axis and which are configured to form an image on the image sensor. There is a mount, fixed within the housing, that has a frame, which holds the image sensor and is configured to rotate about the optical axis. The mount also has an actuator, which is configured to drive the frame to rotate about the axis. A controller is coupled to receive a signal indicative of a rotation of the housing about the optical axis and to drive the actuator to apply an opposing rotation to the frame.

16 Claims, 6 Drawing Sheets

CAMERA COMPRISING A ROLL CORRECTION ACTUATOR

CROSS-REFERENCE TO RELATED APPLICATION

This application claims the benefit of U.S. Provisional Patent Application 63/582,245, filed Sep. 13, 2023, which is incorporated herein by reference.

FIELD OF THE INVENTION

The present invention relates generally to optical imaging, and specifically to images formed by a camera.

BACKGROUND

A camera may sometimes be held so that the image formed by the camera, on a sensor of the camera, is skewed. Such a skewed image may be corrected, to an un-skewed state, by digital cropping.

SUMMARY

Embodiments of the present invention that are described hereinbelow provide improved methods and devices for correcting skewed images.

A disclosed embodiment provides a camera, consisting of:
a housing;
an image sensor contained in the housing;
objective optics, which are coupled to the housing and which have an optical axis and are configured to form an image on the image sensor;
a mount fixed within the housing and having:
a frame, which holds the image sensor and is configured to rotate about the optical axis; and
an actuator, which is configured to drive the frame to rotate about the axis; and
a controller, which is coupled to receive a signal indicative of a rotation of the housing about the optical axis and to drive the actuator to apply an opposing rotation to the frame.

Typically, the camera has a substrate, fixed to the frame, whereon the image sensor is mounted, and wherein the actuator includes a pair of voice control motors coupled to the substrate. Each voice control motor may have a magnet assembly having a plurality of linearly arranged permanent magnets positioned with alternate polarities.

In a further disclosed embodiment the plurality of permanent magnets consists of three permanent magnets wherein neighboring magnets are separated by a non-ferromagnetic spacer.

Each voice control motor may have a coil assembly fixed to the substrate. The coil assembly may consist of a pair of coils, lying in a common plane, connected in series and configured so that current through a first coil of the pair rotates in a clockwise direction and through a second coil of the pair rotates in a counterclockwise direction.

In a yet further disclosed embodiment each voice control motor consists of a magnet assembly having three linearly coupled permanent magnets positioned with alternate polarities wherein neighboring magnets are separated by a non-ferromagnetic spacer aligning with a center of one of the pair of coils.

In an alternative embodiment a first voice control motor of the pair of voice control motors is located at a first displacement from the optical axis, and a second voice control motor of the pair is located at a second displacement from the optical axis, wherein the second displacement is equal in magnitude and opposite in direction to the first displacement. Typically, the controller is configured to drive the first voice control motor to exert a first force, orthogonal to the optical axis, on the frame, and to drive the second voice control motor to a exert a second force, equal in magnitude and opposite in direction to the first force, on the frame.

In a further alternative embodiment the mount has a further frame fixed to the housing and the actuator consists of a pair of voice control motors, each voice control motor having a magnet assembly fixed to the further frame and a coil assembly fixed to the frame.

There is further provided, to an according embodiment of the present invention, a method, consisting of:
providing a housing for a camera;
positioning an image sensor in the housing;
coupling objective optics, having an optical axis, to the housing and configuring the objective optics to form an image on the image sensor;
fixing a mount within the housing, the mount having:
a frame, which holds the image sensor and is configured to rotate about the optical axis; and
an actuator, which is configured to drive the frame to rotate about the axis;
receiving a signal indicative of a rotation of the housing about the optical axis; and
in response to the signal, driving the actuator to apply an opposing rotation to the frame.

The present invention will be more fully understood from the following detailed description of the embodiments thereof, taken together with the drawings in which:

DETAILED DESCRIPTION OF EMBODIMENTS

Overview

Figure 1A:
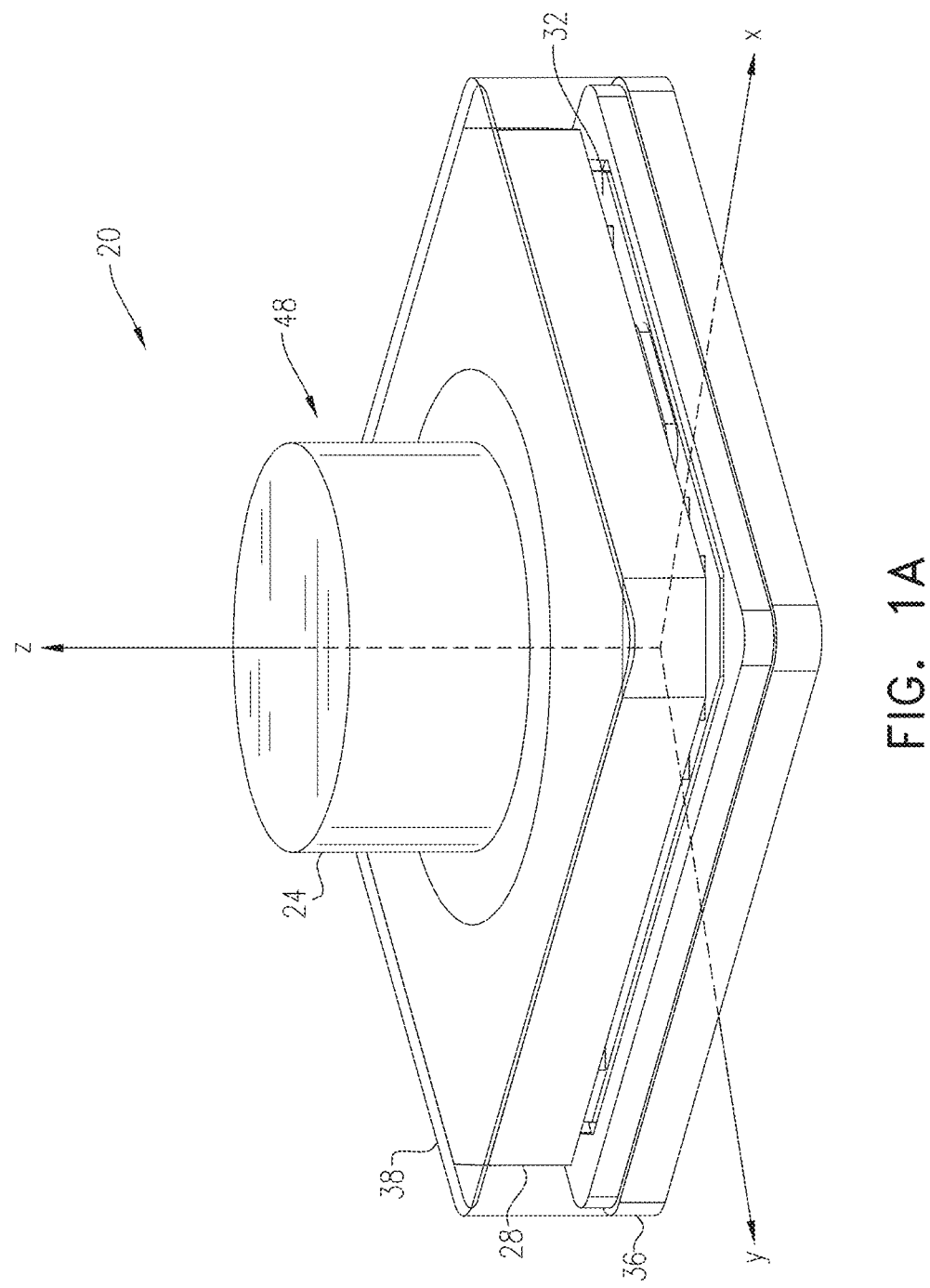
FIG. 1A shows a schematic illustration of a camera.

In a camera with a rectangular image sensor, the camera is normally oriented, with respect to the optical axis of the camera, so that the edges of the sensor align with horizontal and vertical axes of a scene being imaged. In this "normal" orientation an image produced by the sensor is not skewed or tilted, so that "horizontal" sensor edges are parallel to the scene horizontal axis, and "vertical" sensor edges are parallel to the scene vertical axis. If the camera is held in an orientation wherein the sensor edges do not align with the axes, i.e., if the camera is rotated about its optical axis to a "non-normal" orientation, then the image on the sensor is skewed. For example, the horizon in an image where the camera is rotated is not parallel to the sensor horizontal edges, and a flagpole in the image is not parallel to the sensor vertical edges.

A skewed image may be corrected by cropping the image, so that in the above example, the horizon and the flagpole become parallel to the cropped image edges. However, the cropping, of necessity, reduces the size of the imaged scene.

Embodiments of the present invention overcome the problem of a non-normally oriented camera without cropping the image, by controllably rotating the image sensor, about the camera optical axis, so that the sensor edges are parallel to the scene axes.

The sensor is fixedly attached to a substrate, and the substrate in turn is flexibly attached, by spring-like flexures, to a magnet holder. In the camera, the magnet holder is held in a mount that is fixed with respect to the optical axis of the camera, but because of its flexible attachment, the sensor and its substrate may be rotated, in a controllable manner, about the camera optical axis.

Two voice coil motors operate as an actuator for performing the controlled rotation. Each motor comprises a magnet assembly and a coil assembly, and the motors are positioned on the substrate, on opposite sides of, and equidistant from, a point where the camera optical axis intersects the image sensor.

The magnet assemblies of the motors are held by the magnet holder, and the coil assemblies are fixed to the substrate. The motors are configured so that when activated, the coil assemblies experience respective Lorentz forces that are equal in magnitude and opposite in direction.

The camera comprises a controller, which is coupled to receive a signal indicative of a non-normal orientation of the camera. The signal may be generated by any means known in the art, for example, analysis of an image acquired by the sensor, and/or analysis of a signal from an accelerometer coupled to the camera.

To implement the required sensor rotation, in response to the received signal, the controller activates currents in each coil assembly, so as to generate the two forces described above. The oppositely directed forces from the coil assemblies generate a torque about the optical axis, and this torque rotates the sensor substrate, and the sensor, about the optical axis.

Because the sensor substrate is attached by flexures to the magnet holder (which is fixed with respect to the optical axis), the substrate rotation causes the flexures to exert a countervailing torque on the rotated substrate. The controller may set the currents through the coil assemblies that the resultant angle of rotation of the substrate and the sensor places the sensor in a normal orientation.

System Description

Figure 1B:
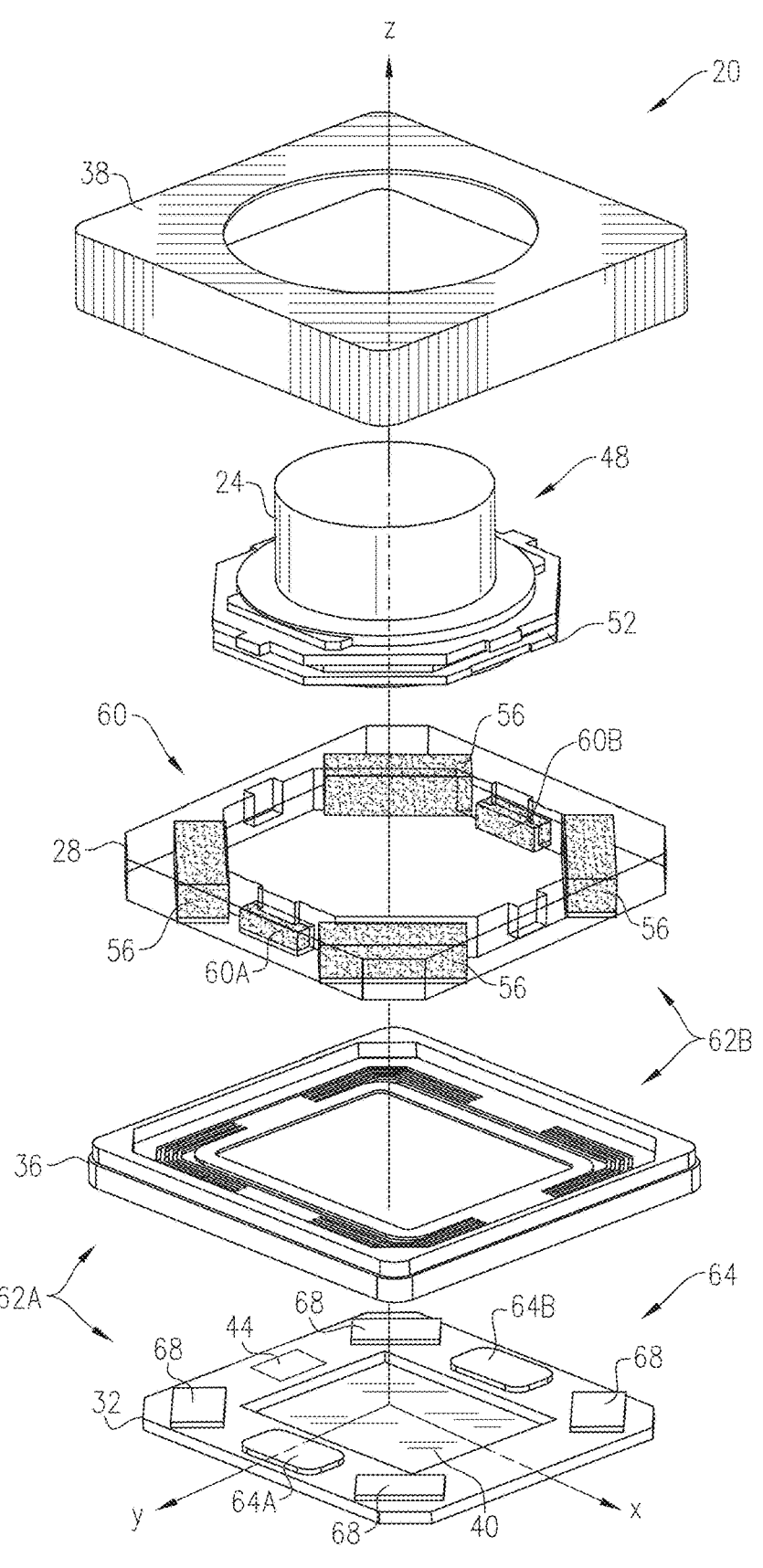
FIG. 1B shows an exploded view of elements of the camera, according to an embodiment of the present invention.

FIG. 1A shows a schematic illustration of a camera 20, and FIG. 1B shows an exploded view of elements of the camera, according to an embodiment of the present invention. Camera 20 is formed of an optics assembly 24, a magnet holder 28, a sensor-retaining substrate 32, also referred to herein as a substrate 32, and an optical image stabilization (OIS) mount 36, which connects the sensor-retaining substrate to the magnet holder. Camera 20 has a housing 38 (shown in outline in FIG. 1A) which encloses and shields some of the elements of the camera. Camera 20 and its elements have been drawn on a set of xyz coordinate axes, wherein the z-axis corresponds to the optical axis of assembly 24, the x and y axes are parallel to edges of a rectangular image sensor 40, fixed to substrate 32, and the origin of the coordinate axes is at the center of sensor 40.

Camera 20 is operated by a controller 44, which is herein, by way of example, assumed to be located on substrate 32.

However, controller 44 may be located on any other element of camera 20, or may be external to the camera.

Optics assembly 24 comprises objective optics 48 which are configured to focus a scene viewed by the camera onto sensor 40, and the assembly also comprises an autofocus (AF) coil 52, fixedly attached to the assembly, which may be used by CPU 44 to translate the optics assembly along the z-axis, so as to focus the viewed scene onto sensor 40. For its operation AF coil 52 uses magnetic fields generated by four permanent magnets 56 held by magnet holder 28, and the method of operation of assembly 24 and AF coil 52 are described in US Patent Application 2019/0141248, which is assigned to the assignee of the present invention and which is incorporated herein by reference.

In addition to permanent magnets 56, magnet holder 28 fixedly holds a permanent magnet assembly 60A and a substantially similar permanent magnet assembly 60B, also generically referred to herein as magnet assemblies 60. Magnet assemblies 60 are located in holder 28 on a line parallel to the y-axis, and are equidistant from the z-axis.

A coil assembly 64A is mounted on substrate 32, in proximity to and aligned with magnet assembly 60A, and a coil assembly 64B is mounted on the substrate in proximity to and aligned with magnet assembly 60B. Coil assembly 64A and 64B are generically referred to herein as coil assemblies 64. As for magnet assemblies 60, coil assemblies 64 are located on substrate 32 on a line parallel to the y-axis and are also equidistant from the z-axis. The separation of magnet assembly 60A from magnet assembly 60B is substantially the same as the separation of coil assembly 64A from coil assembly 64B.

Coil assembly 64A and magnet assembly 60A operate as a voice coil motor 62A, so that by directing a current through the coil assembly, a Lorentz force is impressed on the coil assembly. Similarly, coil assembly 64B and magnet assembly 60B operate as a voice coil motor 62B, so that a current directed through the coil assembly causes a Lorentz force to be impressed on the coil assembly. As is described herein, embodiments of the present invention use the forces generated by voice coil motor 62A and voice coil motor 62B to generate a torque about the z-axis on sensor-retaining substrate 32. The operation of the voice coil motors, including the structure and functionality of magnet assemblies 60 and coil assemblies 64, is described in detail below.

(Also mounted on substrate 32 are four coils 68 proximate to magnets 56, and configured to be within the fields of the magnets. The coils may be used to translate substrate 32 in an x or a y direction, as is also described in US Patent Application 2019/0141248.)

Figure 2A:
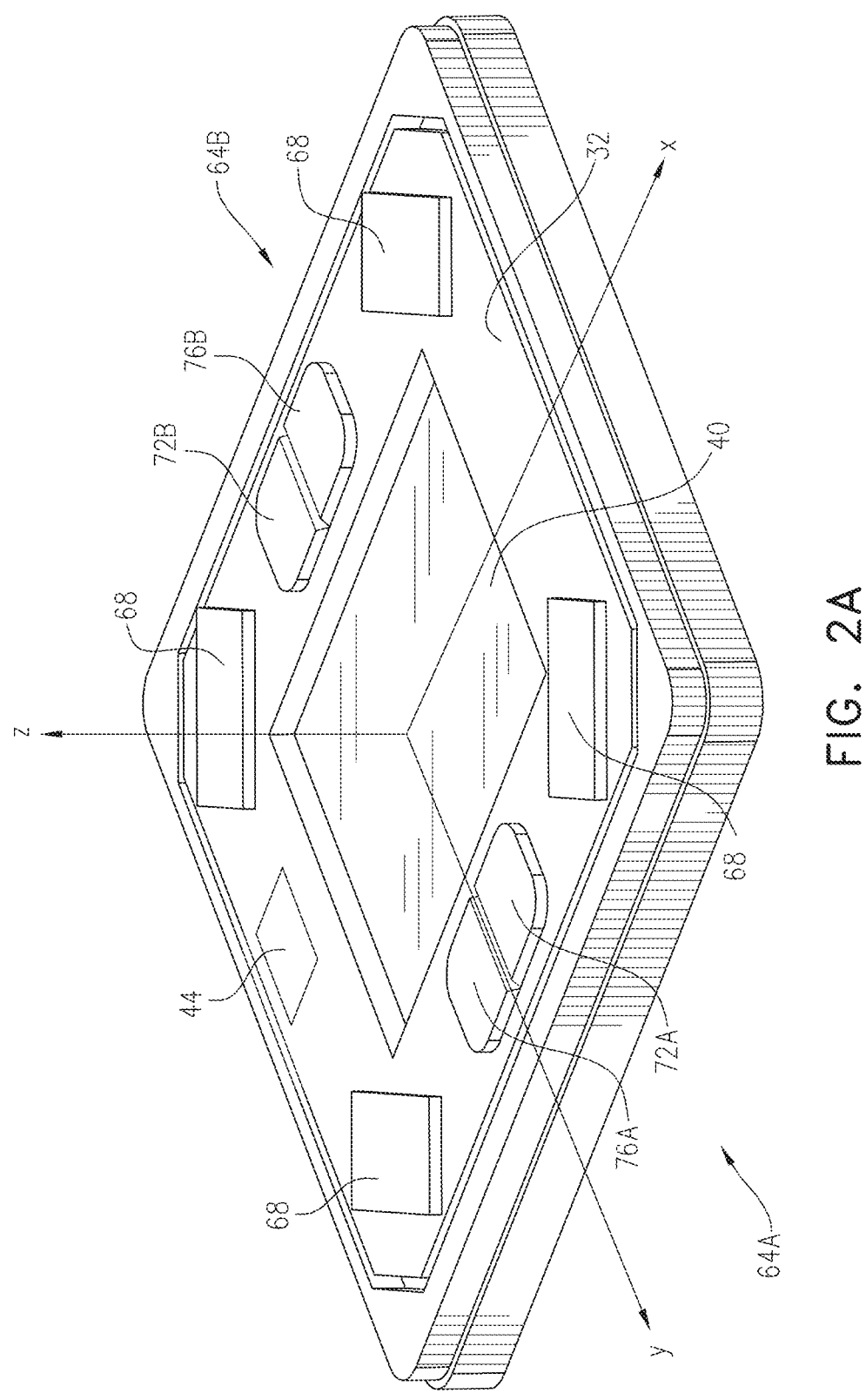
FIGS. 2A and 2B are schematic diagrams of a substrate, according to an embodiment of the present invention.
Figure 2B:
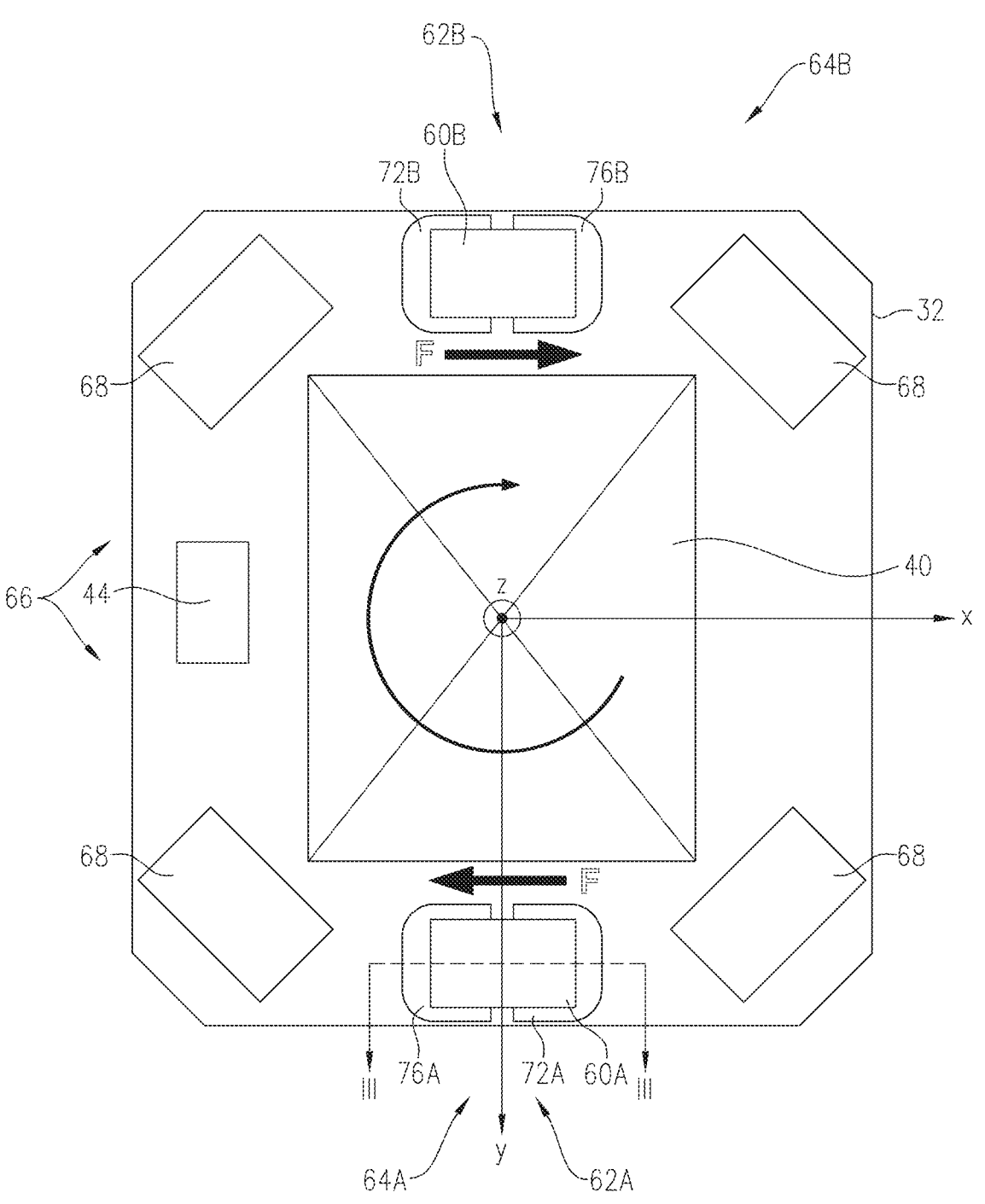

FIGS. 2A and 2B are schematic diagrams of substrate 32, according to an embodiment of the present invention. FIG. 2A is a perspective view of substrate 32, and FIG. 2B is a top-down view of the substrate, to which magnetic assemblies 60 have also been added. As shown in FIGS. 2A and 2B, coil assembly 64A comprises a coil 76A and a coil 72A, and coil assembly 64B comprises a coil 76B and a coil 72B. Coil 76A and coil 76B are generically referred to herein as coils 76, and coil 72A and coil 72B are generically referred to herein as coils 72.

Coils 76 and 72 are configured to have similar shapes, and the coils are formed as generally planar coils. Each pair of coils 76 and 72 is attached to substrate 32 so that the pair is on a common xy plane, and so that a line segment joining centers of the coils is parallel to the x-axis.

In an embodiment, coils 72 and 76 are formed from one or more layers of printed circuit board (PCB), each layer of the PCB comprising a spiral of conducting traces, the endpoints of the spirals being connected, between the layers, by conducting vias. In one embodiment the PCBs have two layers, but other embodiments may have more than two layers. When attached to substrate 32, coils 72 and 76 are connected in series, so that a common current flows through both coils, and so that the direction of the current flow, either clockwise or counterclockwise, is opposite for the coils.

In one embodiment coils 72 and 76 are approximately rectangular having an approximate height of 40 μm, an approximate width of 31 μm, and the coils have 110 turns.

The black arrows and letter "F" in FIG. 2B are referred to below.

Figure 3:
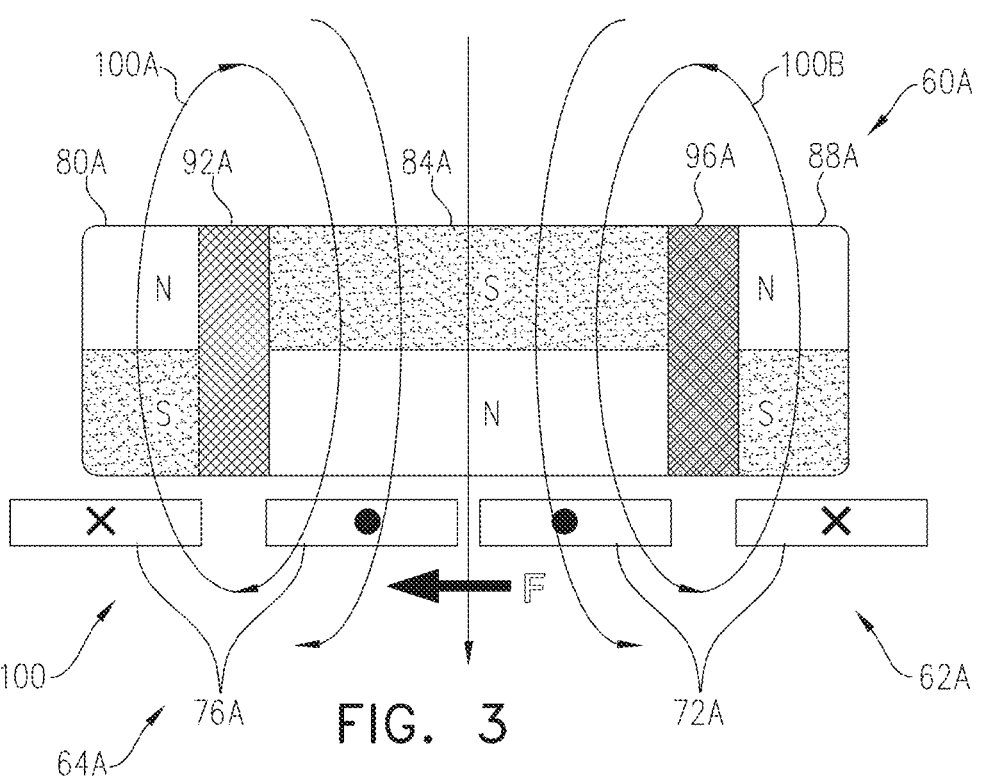
FIG. 3 is a schematic cross-section of a voice coil motor.
Figure 4:
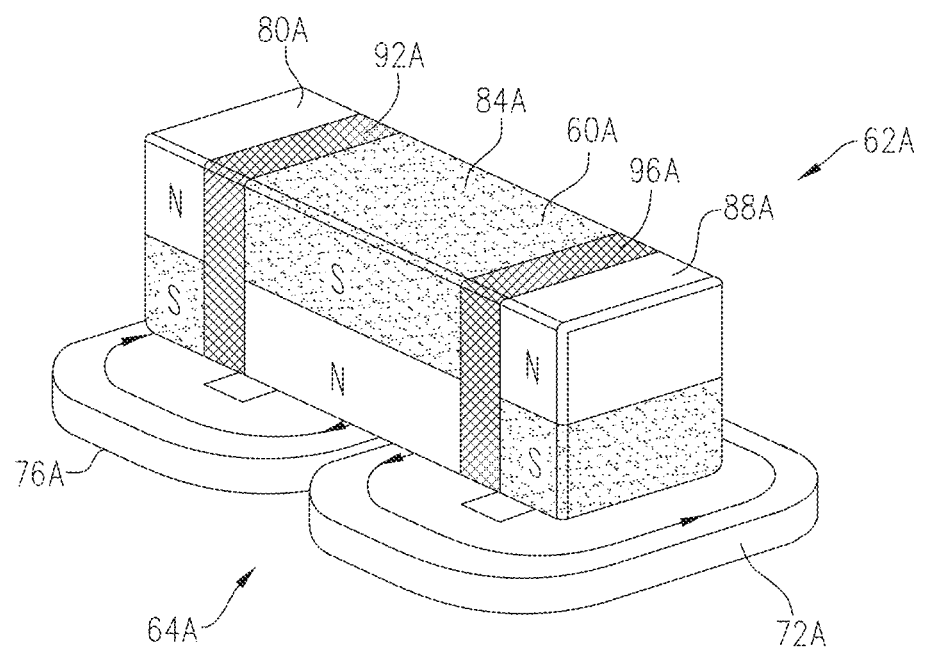
FIG. 4 is a perspective view of the motor, according to an embodiment of the present invention.

FIG. 3 is a schematic cross-section of voice coil motor 62A, i.e., of magnet assembly 60A and coil assembly 64A, i.e., coils 72A and 76A, taken along a line segment III-III of FIG. 2B, and FIG. 4 is a perspective view of motor 62A, according to an embodiment of the present invention.

Magnet assembly 60A is formed of three permanent magnets, a magnet 80A, a magnet 84A, and a magnet 88A, and in the embodiment described herein the three magnets are assumed to be connected together in the form of rectangular parallelepipeds. Magnets 80A and 88A have substantially the same dimensions. Magnet 84A has the same height and depth as the other magnets, but is longer; in one embodiment magnet 84A is approximately four times as long as magnet 80A or magnet 88A.

The three magnets are coupled and arranged together linearly, with the longest magnet, magnet 84A, between the two smaller magnets. There is a non-ferromagnetic spacer 92A between magnet 80A and magnet 84A, and a similar non-ferromagnetic spacer 96A substantially between magnet 84A and magnet 88A. The five elements of assembly 60A: magnet 80A, spacer 92A, magnet 84A, spacer 96A, and magnet 88A are cemented together, in that order, so as to form one rectangular parallelepiped, and so that the three magnets are positioned with alternating polarities. I.e., viewed from above the poles of magnets 80A, 84A, and 88A are arranged North-South-North, and viewed from below the poles are South-North-South.

By arranging the poles of the three magnets to alternate as described above, and by inserting spacers 92A and 96A between the magnets, the magnetic field lines generated by the magnets, generically referred to herein as field lines 100, are approximately elliptical, and are approximately centered on spacer 92A and 96A. Thus, a field line 100A generated by magnets 80A and 84A is approximately centered on spacer 92A, and a field line 100B generated by magnets 84A and 88A is approximately centered on spacer 96A.

As is illustrated in FIG. 2B magnet assembly 60A, and magnet assembly 60B, which are fixedly held by holder 28, have their sides aligned with the xyz coordinate axes.

Coils 72A and 76A are positioned below magnet assembly 64A, so that the center of each coil aligns with one of spacers 92A, 96A, and so that the short straight sides of the coils are approximately parallel to the x-axis, and the long sides of the coils are approximately parallel to the y-axis.

To activate voice coil motor 62A, controller 44 directs a current through coils 72A and 76A. As stated above, the coils are connected in series, and are configured so that in one coil the current follows a clockwise path, while following a counterclockwise path in the other coil. In the figures the current is assumed to be clockwise for coil 76A and counterclockwise for coil 72A, Thus, the direction of the current through the straight sides of the coils, the sides parallel to the y-axis, is as shown in FIG. 3, where an "x" corresponds to a current direction into the page, and a dot corresponds to a current direction out of the page. The current directions are also shown schematically in FIG. 4, as curved arrowed lines overlaid on the coils.

Because of the magnetic fields intersecting the straight sides of the coils, there is a Lorentz force on each of the four long sides of the coils. Each Lorentz force is normal to the direction of the field intersection and to the side of the coil being intersected, so that for each Lorentz force there is a non-zero component parallel to the x-axis. These forces sum, to give a resultant force, parallel to the x-axis, on the coils of coil assembly 64A, and thus on substrate 32 to which the assembly is attached.

The description above applies for voice coil motor 62A and its components, and illustrates how the motor may be used to generate a force on the coil assembly of the motor. Those having ordinary skill in the art will be able to apply the description, mutatis mutandis, to voice coil motor 62B and its component magnet assembly 60B and coil assembly 64B. Thus, it will be understood that as for motor 62A, controller 44 may activate voice coil motor 62B by directing a current through coils 72B and 76B of coil assembly 64B. The activation produces a Lorentz force on each of the long sides of coils 72B and 76B, so that there is a resultant force on coil assembly 64B, and thus on substrate 32, parallel to the x-axis.

Embodiments of the invention configure the currents directed by controller 44 to coil assemblies 64A and 64B to produce respective resultant forces on the assemblies having equal magnitudes, but opposite directions. The resultant forces are illustrated, in FIG. 2B, by the straight black arrows and letters "F" proximate to assemblies 64A and 64B.

The two opposing, but spatially separated, forces generate a torque on substrate 32, and the torque is illustrated in FIG. 2B by the curved circular black arrow. Voice coil motor 62A and voice coil motor 62B together act as an actuator 66 that creates the torque on substrate 32, and thus causes rotation of the substrate, as is explained further below.

Figure 5:
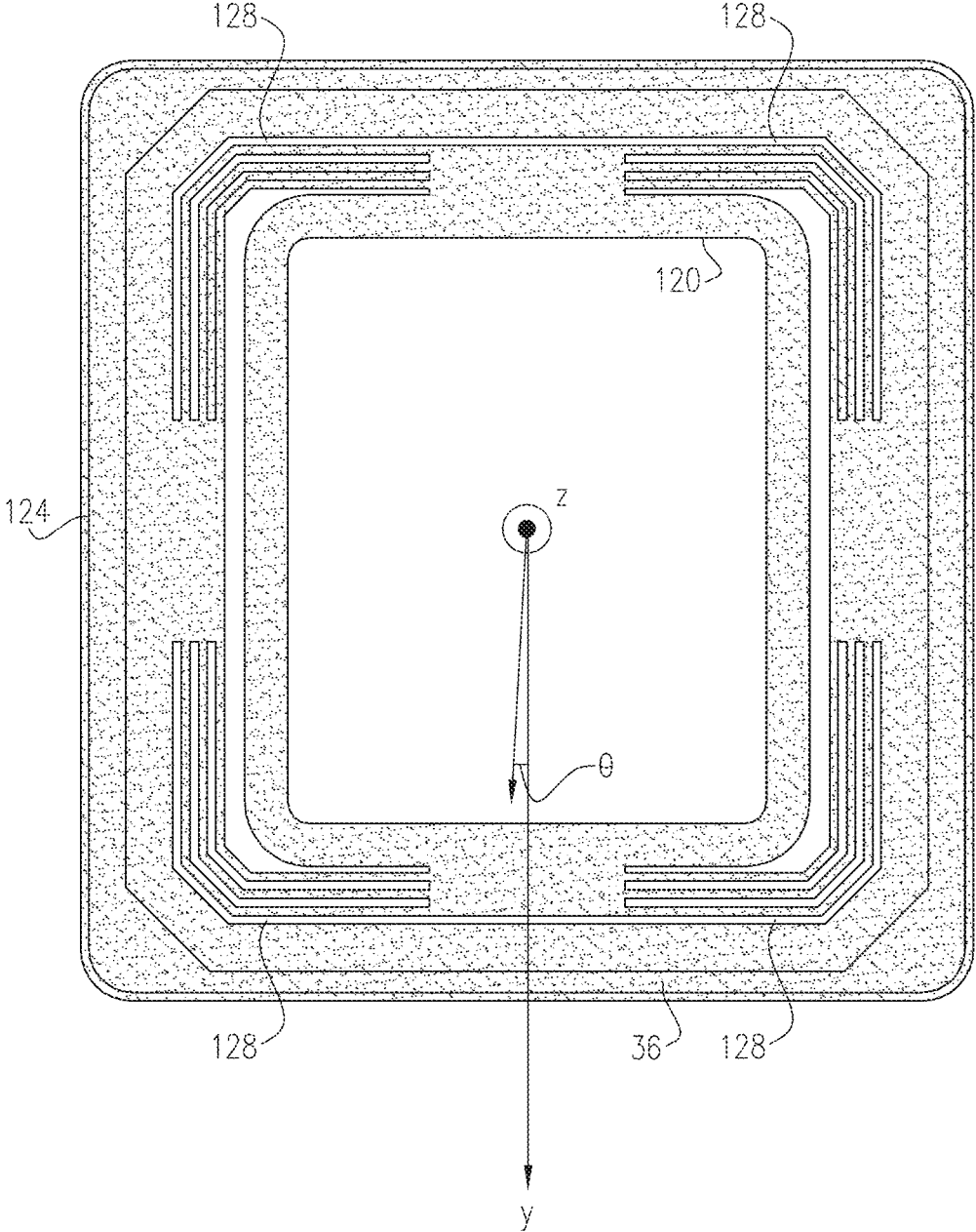
FIG. 5 schematically illustrates an optical image stabilization (OIS) mount, according to an embodiment of the present invention.

FIG. 5 schematically illustrates optical image stabilization (OIS) mount 36, according to an embodiment of the present invention. Mount 36 comprises two frames, an inner frame 120 and an outer frame 124. Frame 120 is configured to hold sensor-retaining substrate 32, and thus image sensor 40, which is fixed to the substrate. Frame 124 is fixed to housing 38 (FIG. 1) and is configured to hold magnet holder 28. For clarity sensor-retaining substrate 32 and magnet holder 28 are not shown in the figures.

The two frames are connected by springlike flexures 128.

When OIS mount 36 is in an un-torqued state, there are no forces generated on coil assemblies 64A and 64B.

When OIS mount 36 is in a torqued state, forces generated on coil assemblies 64A and 64B are equal in magnitude but opposite in direction. The torque causes inner frame 120 to rotate about the camera optical axis, the z-axis, until flexures 126 exert a countervailing, equal and opposite, torque on the frame. Flexures 126 are assumed to have a spring constant $k_z$. The rotation is illustrated as an angle θ measured from the y-axis.

In operating camera 20, controller 44 receives a signal indicating an angle, herein assumed to be −θ, that housing 38 of the camera has rotated about the camera optical axis.

The controller activates voice coil motors 62A and 62B, by applying currents to coil assemblies 64A and 64B, to produce a countervailing torque T, so that inner frame 120 is rotated by an angle opposite to that received by controller 44. T is given by equation (1):

$$T = k_z \cdot \theta \tag{1}$$

In one embodiment $k_z$ is approximately equal to 250 mN·mm/°.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A camera, comprising:
a housing;
an image sensor contained in the housing;
objective optics, which are coupled to the housing and which have an optical axis and are configured to form an image on the image sensor;
a mount fixed within the housing and comprising:
a frame, which comprises a substrate whereon the image sensor is mounted, and which is configured to rotate about the optical axis; and
an actuator, which is configured to drive the frame to rotate about the axis and comprises a pair of voice coil motors coupled to the substrate, each voice coil motor comprising a magnet assembly comprising three linearly arranged permanent magnets with alternating polarities; and
a controller, which is coupled to receive a signal indicative of a rotation of the housing about the optical axis and to drive the actuator to apply an opposing rotation to the frame.

2. The camera according to claim 1, wherein neighboring magnets are separated by a non-ferromagnetic spacer.

3. The camera according to claim 1, wherein each voice coil motor comprises a coil assembly fixed to the substrate.

4. The camera according to claim 3, wherein the coil assembly comprises a pair of coils, lying in a common plane, connected in series and configured so that current through a first coil of the pair rotates in a clockwise direction and through a second coil of the pair rotates in a counterclockwise direction.

5. The camera according to claim 4, wherein neighboring magnets are separated by a non-ferromagnetic spacer aligning with a center of one of the pair of coils.

6. The camera according to claim 1, wherein a first voice coil motor of the pair is located at a first displacement from the optical axis, and a second voice coil motor of the pair is located at a second displacement from the optical axis, wherein the second displacement is equal in magnitude and opposite in direction to the first displacement.

7. The camera according to claim 6, wherein the controller is configured to drive the first voice coil motor to exert a first force, orthogonal to the optical axis, on the frame, and to drive the second voice coil motor to a exert a second force, equal in magnitude and opposite in direction to the first force, on the frame.

8. The camera according to claim 1, wherein the mount comprises a further frame fixed to the housing, each voice coil motor having the magnet assembly fixed to the further frame and a coil assembly fixed to the frame.

9. A method, comprising:
providing a housing for a camera;
positioning an image sensor in the housing;
coupling objective optics, having an optical axis, to the housing and configuring the objective optics to form an image on the image sensor;
fixing a mount within the housing, the mount comprising:
a frame, which comprises a substrate whereon the image sensor is mounted, and which is configured to rotate about the optical axis; and
an actuator, which is configured to drive the frame to rotate about the axis and comprises a pair of voice coil motors coupled to the substrate, each voice coil motor comprising a magnet assembly comprising three linearly arranged permanent magnets with alternating polarities;
receiving a signal indicative of a rotation of the housing about the optical axis; and
in response to the signal, driving the actuator to apply an opposing rotation to the frame.

10. The method according to claim 9, wherein neighboring magnets are separated by a non-ferromagnetic spacer.

11. The method according to claim 9, wherein each voice coil motor comprises a coil assembly fixed to the substrate.

12. The method according to claim 11, wherein the coil assembly comprises a pair of coils, lying in a common plane, connected in series and configured so that current through a first coil of the pair rotates in a clockwise direction and through a second coil of the pair rotates in a counterclockwise direction.

13. The method according to claim 12, wherein neighboring magnets are separated by a non-ferromagnetic spacer aligning with a center of one of the pair of coils.

14. The method according to claim 9, and comprising locating a first voice coil motor of the pair at a first displacement from the optical axis, and locating a second voice coil motor of the pair at a second displacement from the optical axis, wherein the second displacement is equal in magnitude and opposite in direction to the first displacement.

15. The method according to claim 14, wherein driving the actuator comprises configuring the first voice coil motor to exert a first force, orthogonal to the optical axis, on the frame, and configuring the second voice coil motor to a exert a second force, equal in magnitude and opposite in direction to the first force, on the frame.

16. The method according to claim 9, wherein the mount comprises a further frame fixed to the housing, each voice coil motor having the magnet assembly fixed to the further frame and a coil assembly fixed to the frame.

* * * * *